(12) United States Patent
Krishnaswamy et al.

(10) Patent No.: US 10,706,235 B2
(45) Date of Patent: Jul. 7, 2020

(54) SYSTEM AND METHOD FOR GENERATING A RICH PERSISTENT CONVERSATION HISTORY USING A COMMUNICATION PROTOCOL

(71) Applicants: Venkatesh Krishnaswamy, San Ramon, CA (US); Ajita John, Holmdel, NJ (US); David Skiba, Golden, CO (US); Kundan Singh, San Francisco, CA (US); Shalini Yajnik, Berkeley Heights, NJ (US); Ramanujan Kashi, Bangalore (IN)

(72) Inventors: Venkatesh Krishnaswamy, San Ramon, CA (US); Ajita John, Holmdel, NJ (US); David Skiba, Golden, CO (US); Kundan Singh, San Francisco, CA (US); Shalini Yajnik, Berkeley Heights, NJ (US); Ramanujan Kashi, Bangalore (IN)

(73) Assignee: Koopid, Inc, San Ramon, CA (US)

(*) Notice: Subject to any disclaimer, the term of this patent is extended or adjusted under 35 U.S.C. 154(b) by 66 days.

(21) Appl. No.: 16/179,968

(22) Filed: Nov. 4, 2018

(65) Prior Publication Data
US 2020/0142958 A1     May 7, 2020

(51) Int. Cl.
*G06F 17/20*     (2006.01)
*G06F 40/30*     (2020.01)
*H04L 12/58*     (2006.01)
*G06F 17/27*     (2006.01)

(52) U.S. Cl.
CPC ............. *G06F 40/30* (2020.01); *H04L 51/16* (2013.01)

(58) Field of Classification Search
CPC ................................ G06F 40/30; H04L 51/16
USPC ............................................................ 704/9
See application file for complete search history.

(56) References Cited

U.S. PATENT DOCUMENTS

2018/0232376 A1*   8/2018   Zhu ..................... G06F 40/35

* cited by examiner

*Primary Examiner* — Thierry L Pham

(57) ABSTRACT

A method for generating a rich persistent conversation history from structured and unstructured information using a communication protocol is provided. The method includes (i) receiving media contents associated with conversations from messaging channels, (ii) selecting a set of selected messaging channels from where the media contents are received, (iii) demarcating boundaries in each of the media contents associated with the conversations based on an activity of users, (iv) inserting segmentation demarcations to a first conversation to differentiate the first conversation from a second conversation, (v) determining communication elements for each conversation associated with the segmentation demarcations on each messaging channel, (vi) generating a conversation snippet by linking the communication elements for each messaging channel, (vii) linking conversation snippets to generate a segment associated with the conversation for each messaging channel using lexical and non-lexical features and (viii) generating the rich persistent conversation history by linking segments from the messaging channels.

20 Claims, 8 Drawing Sheets

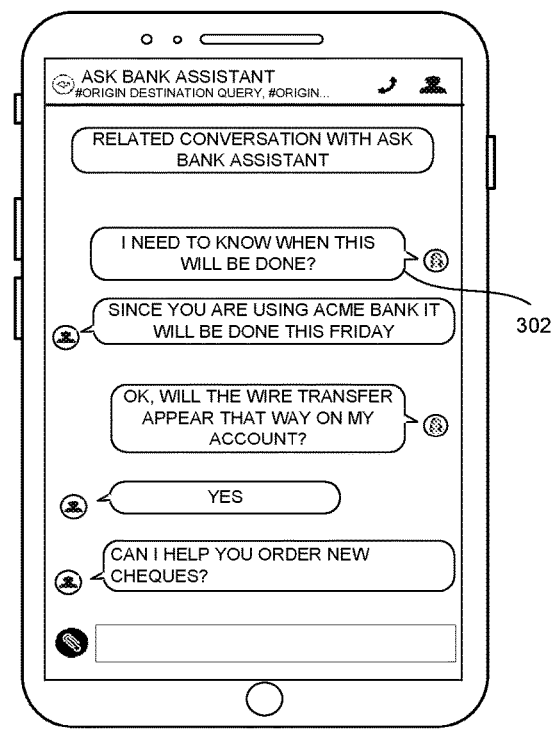
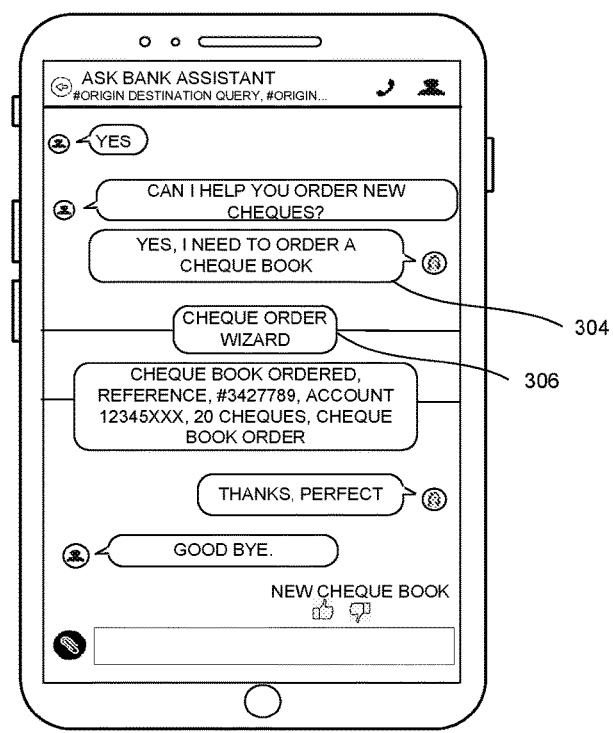
FIG. 3A
FIG. 3B

SYSTEM AND METHOD FOR GENERATING A RICH PERSISTENT CONVERSATION HISTORY USING A COMMUNICATION PROTOCOL

BACKGROUND

Technical Field

Embodiments of this disclosure generally relate to generating a rich persistent conversation history, more particularly, to a system and method for generating a rich persistent conversation history from structured and unstructured information using a communication protocol.

Description of the Related Art

Messaging vendors currently in the market treat each channel of communication as a silo. As an example, information from the chat channel is not integrated with the information from the voice channel. Customer or business agents (e.g. contact center agents) have to look at their interaction with the same agent or business or customer across channels and collate that information themselves to get the full context of the communication. Customers chatting with a business on the business web page do not get a full history of their previous communication with the business. Additionally, most vendors do not support structured data types over the communication channel.

There are some vendors who have started tackling the type of content aspect of the problem. As an example, Facebook messenger provides some form of structured content on their messaging platform. Messenger provides templates like buttons, slide-ins etc to add more structured elements to their chats. They also have a notion similar to widgets (like the airline check in widget). However, their protocol does not seem to incorporate designing and adding generic structured components into their platform.

Accordingly, there remains a need for a system and method for generating a rich persistent conversation history from structured and unstructured information using a communication protocol.

SUMMARY

In view of the foregoing, an embodiment herein provides a method for generating a rich persistent conversation history from structured and unstructured information using a communication protocol. The method includes steps of (i) receiving one or more media contents associated with conversations from one or more messaging channels, (ii) selecting a set of selected messaging channels from where the one or more media contents are received based on at least one of common attributes of one or more users, time, or a topic, (iii) demarcating boundaries in each of the one or more media contents associated with the conversations based on an activity of the one or more users by analyzing topics of each conversation between the one or more users, (iv) inserting segmentation demarcations to a first conversation to differentiate the first conversation from a second conversation based on the topics and widgets that are communicated between a first user and a second user, (v) determining one or more communication elements for each conversation associated with the segmentation demarcations on each messaging channel, (vi) generating a conversation snippet by linking the one or more communication elements for each messaging channel, (vii) linking conversation snippets to generate a segment associated with the conversation for each messaging channel using lexical and non-lexical features and (viii) generating the rich persistent conversation history by linking one or more segments from the one or more messaging channels. The first conversation is a previous conversation between the first user and the second user and the second conversation is a present conversation between the first user and the second user.

In one embodiment, the method includes step of generating a cross channel segment by linking the conversations received from the one or more messaging channels based on the topics.

In another embodiment, the conversation snippets in the segment associated with the messaging channel are linked with other segment associated with other messaging channel.

In yet another embodiment, the one or more media contents include at least one of (a) a text message conversation, (b) a voice call conversation, (c) a video call conversation, or (d) any other digital form of communication between the one or more users.

In yet another embodiment, the method includes step of inserting the segmentation demarcations in the conversation when the first user initiates a workflow or a widget during the conversation to differentiate the conversation. The segmentation demarcations are inserted when the first user initiates the activity in the messaging channel or the conversation is manually closed by the first user or the second user. The activity includes at least one of (a) switching to one conversation to another conversation, (b) initiating a voice call to the second user or (c) initiating a video call to the second user.

In yet another embodiment, the conversation snippet includes the one or more media contents related to a particular conversation between the first user and the second user for a particular timestamp.

In yet another embodiment, the one or more segments include at least one of (a) a text conversation between the first user and the second user, (b) a voice call conversation between the first user and the second user, (c) a recorded call conversation between the first user and the second user or (d) any other digital form of communication between the first user and the second user.

In yet another embodiment, the method includes steps of identifying the conversation snippets to be displayed to the first user from the rich persistent conversation history based on a request received from the first user and displaying the conversation snippets to the first user when the first user request for the conversation snippets.

In yet another embodiment, the rich persistent conversation history includes the one or more segments of the conversations between the first user and the second user.

In yet another embodiment, the voice call of a voice channel is fed to the messaging channel in the form of control messages. The voice call is being initiated as an "info" message into the messaging channel.

In yet another embodiment, the voice call is recorded as a media message in the messaging channel, adds transcripts in either as a regular chat message or as an info message and integrates the rich persistent conversation history from the voice channel into the messaging channel.

In one aspect, one or more non-transitory computer readable storage mediums storing one or more sequences of instructions, which when executed by one or more processors, causes a processor implemented method for generating a rich persistent conversation history from structured and unstructured information using a communication protocol is provided. The one or more non-transitory computer readable storage mediums includes the steps of: (i) receiving one or more media contents associated with conversations from one or more messaging channels, (ii) selecting a set of selected messaging channels from where the one or more media contents are received based on at least one of common attributes of one or more users, time, or a topic, (iii) demarcating boundaries in each of the one or more media contents associated with the conversations based on an activity of the one or more users by analyzing topics of each conversation between the one or more users, (iv) inserting segmentation demarcations to a first conversation to differentiate the first conversation from a second conversation based on the topics and widgets that are communicated between a first user and a second user, (v) determining one or more communication elements for each conversation associated with the segmentation demarcations on each messaging channel, (vi) generating a conversation snippet by linking the one or more communication elements for each messaging channel, (vii) linking conversation snippets to generate a segment associated with the conversation for each messaging channel using lexical and non-lexical features and (viii) generating the rich persistent conversation history by linking one or more segments from the one or more messaging channels. The first conversation is a previous conversation between the first user and the second user and the second conversation is a present conversation between the first user and the second user.

In one embodiment, the method further includes generation of a cross channel segment by linking the conversations received from the one or more messaging channels based on the topics.

In another embodiment, the conversation snippets in the segment associated with the messaging channel are linked with other segment associated with other messaging channel.

In yet another embodiment, the one or more media contents include at least one of (a) a text message conversation, (b) a voice call conversation, (c) a video call conversation, or (d) any other digital form of communication between the one or more users.

In yet another embodiment, the method includes step of inserting the segmentation demarcations in the conversation when the first user initiates a workflow or a widget during the conversation to differentiate the conversation. The segmentation demarcations are inserted when the first user initiates the activity in the messaging channel or the conversation is manually closed by the first user or the second user. The activity includes at least one of (a) switching to one conversation to another conversation, (b) initiating a voice call to the second user or (c) initiating a video call to the second user.

In yet another embodiment, the conversation snippet includes the one or more media contents related to a particular conversation between the first user and the second user for a particular timestamp.

In yet another embodiment, the one or more segments include at least one of (a) a text conversation between the first user and the second user, (b) a voice call conversation between the first user and the second user, (c) a recorded call conversation between the first user and the second user or (d) any other digital form of communication between the first user and the second user.

In another aspect, a system for generating a rich persistent conversation history from structured and unstructured information using a communication protocol is provided. The system includes a memory that stores a set of instructions and a processor that executes the set of instructions and is configured to (i) receive one or more media contents associated with conversations from one or more messaging channels, (ii) select a set of selected messaging channels from where the one or more media contents are received based on at least one of common attributes of one or more users, time, or a topic, (iii) demarcate boundaries in each of the one or more media contents associated with the conversations based on an activity of the one or more users by analyzing topics of each conversation between the one or more users, (iv) insert segmentation demarcations to a first conversation to differentiate the first conversation from a second conversation based on the topics and widgets that are communicated between a first user and a second user, (v) determine one or more communication elements for each conversation associated with the segmentation demarcations on each messaging channel, (vi) generate a conversation snippet by linking the one or more communication elements for each messaging channel, (vii) link conversation snippets to generate a segment associated with the conversation for each messaging channel using lexical and non-lexical features and (viii) generate the rich persistent conversation history by linking one or more segments from the one or more messaging channels. The first conversation is a previous conversation between the first user and the second user and the second conversation is a present conversation between the first user and the second user.

In one embodiment, the processor is further configured to generate a cross channel segment by linking the conversations received from the one or more messaging channels based on the topics.

The system provides a generic protocol for generating rich persistent conversation history that handle multiple content types and inputs from multiple channels. The protocol also provides ability to store, update and retrieve communication content flowing through the channel.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3A illustrates a user interface view of a first user device of FIG. 1 that depicts a conversation between a first user and a second user according to an embodiment herein;

FIG. 3B illustrates a user interface view of the first user device of FIG. 1 that depicts insertion of a segmentation demarcation in the conversation of FIG. 3A according to an embodiment herein;

DETAILED DESCRIPTION OF PREFERRED EMBODIMENTS

Figure 1:
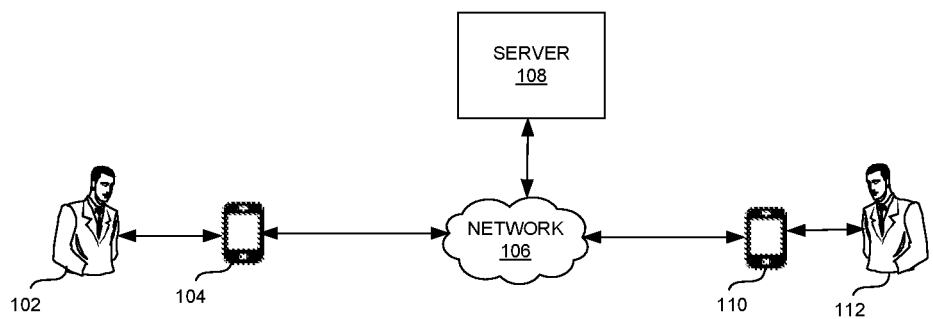
FIG. 1 illustrates a system view for generating a rich persistent conversation history using a communication protocol according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for generating a rich persistent conversation history from structured and unstructured information using a communication protocol. Referring now to the drawings, and more particularly to FIGS. 1 through 7, where similar reference characters denote corresponding features consistently throughout the figures, there are shown preferred embodiments.

FIG. 1 illustrates a system view for generating a rich persistent conversation history using a communication protocol according to an embodiment herein. The system view includes a first user 102, a first user device 104, a network 106, a server 108, a second user device 110 and a second user 112. The server 108 receives one or more media contents associated with conversations from one or more messaging channels. In one embodiment, the one or more media content includes at least one of (a) a text message conversation, (b) a voice call conversation, (c) a video call conversation or (d) any other digital form of communication between the first user 102 and the second user 112. The first user 102 and the second user 112 are communicated using the first user device 104 and the second user device 110 through the network 106. In one embodiment, the network 106 is a wired network. In another embodiment, the network 106 is a wireless network. In one embodiment, the first user device 104 and the second user device 110 may be a mobile phone, a kindle, a PDA (Personal Digital Assistant), a tablet, a computer, an electronic notebook, or a smartphone.

The server 108 selects a set of selected messaging channels from where the one or more media contents are received based on at least one of common attributes of the first user 102 and the second user 112, time, or a topic. For example, if the first user 102 and the second user 112 are on a voice call and communicates messaging information during a subset of the voice call, the server 108 includes both channels as options for linking history, segments and conversations.

The server 108 demarcates boundaries in each of the conversations based on an activity of the first user 102 and the second user 112 by analyzing topics of each conversation between the first user 102 and the second user 112. The server 108 may demarcates boundaries based on conversations of one or more users. The server 108 inserts segmentation demarcations to a first conversation to differentiate the first conversation from a second conversation based on the topics and widgets that are communicated between the first user 102 and the second user 112. The first conversation is a previous conversation between the first user 102 and the second user 112 and the second conversation is a present conversation between the first user 102 and the second user 112. The server 108 may insert the segmentation demarcations in the conversation when the first user 102 initiates a workflow or the widget during the conversation to differentiate the conversation. The segmentation demarcations are inserted when the first user 102 initiates the activity in the messaging channel or the conversation is manually closed by the first user 102 or the second user 112. The activity includes at least one of (a) switching to one conversation to another conversation, (b) initiating a voice call to the second user 112 or (c) initiating a video call to the second user 112. In an embodiment, the second user 112 may be a human agent, an expert, an employee or a form of computerized automated assistant.

The server 108 determines one or more communication elements for each conversation associated with the segmentation demarcations on each messaging channel. In one embodiment, a communication element is at least one of a text message, a video call, a widget over the messaging channel, any other digital form of a communication element that is communicated between the first user 102 and the second user 112. The server 108 generates a conversation snippet by linking the one or more communication elements for each messaging channel. In one embodiment, the conversation snippet includes the one or more media contents related to a particular conversation between the first user 102 and the second user 112 for a particular timestamp. The server 108 links conversation snippets to generate a segment associated with the conversation for each messaging channel using lexical and non-lexical features. In one embodiment, the lexical and non-lexical features are syntax, semantics, topic detection, temporal, interaction type, image detection or speech recognition. The conversation snippets in the segment associated with the messaging channel may be linked with other segment associated with other messaging channel.

The sever 108 may generate a cross channel segment by linking the conversations received from the one or more messaging channels based on the topics. The server 108 generates the rich persistent conversation history by linking one or more segments from the one or more messaging channels. The one or more segments are linked based on the topic analysis performed at each conversation between the first user 102 and the second user 112. In one embodiment, the one or more segments include at least one of (a) a text conversation between the first user 102 and the second user 112, (b) a voice call conversation between the first user 102 and the second user 112, (c) a recorded call conversation between the first user 102 and the second user 112 or (d) any other digital form of communication between the first user 102 and the second user 112. In one embodiment, the voice call of a voice channel is fed to the messaging channel in the form of control messages. In another embodiment, the voice call is being initiated as an "info" message into the messaging channel. In one embodiment, the voice call is recorded as a media message in the messaging channel, adds transcripts in either as a regular chat message or as an info message and integrates the rich persistent conversation history from the voice channel into the messaging channel.

The one or more segments correspond to the conversation enable the first user 102 and the second user 112 to segment the conversation into smaller contextual micro conversations. In one embodiment, the rich persistent conversation history includes the one or more segments of the one or more conversations between the first user 102 and the second user 112. The server 108 may identify the conversation snippets to be displayed to the first user 102 from the rich persistent conversation history based on a request received from the first user 102. The server 108 may display the conversation snippets to the first user 102 when the first user 102 request for the conversation snippets.

Figure 2:
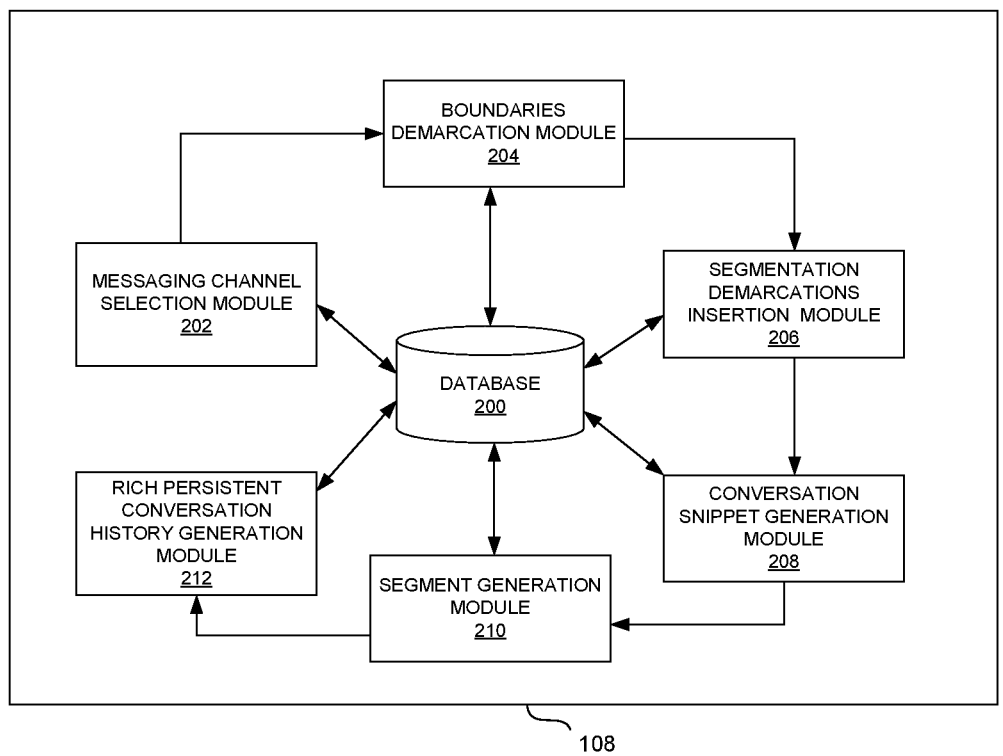
FIG. 2 illustrates an exploded view of a server of FIG. 1 according to an embodiment herein.

FIG. 2 illustrates an exploded view of the server 108 of FIG. 1 according to an embodiment herein. The exploded view includes a database 200, a messaging channel selection module 202, a boundaries demarcation module 204, a segmentation demarcations insertion module 206, a conversation snippet generation module 208, a segment generation module 210, and a rich persistent conversation history generation module 212. The database 200 stores (a) the conversations between the first user 102 and the second user 112, (b) the one or more media contents associated with the one or more conversations and (c) the one or more segments. The messaging channel selection module 202 receives the one or more media contents associated with the conversations from the one or more messaging channels. The messaging channel selection module 202 selects the set of selected messaging channels from where the one or more media contents are received based on at least one of the common attributes of the first user 102 and the second user 112, time, or the topic. The boundaries demarcation module 204 demarcates the boundaries in each of the one or more media contents associated with the conversations based on the activity of the first user 102 and the second user 112 by analyzing the topics of each conversation between the first user 102 and the second user 112. The segmentation demarcations insertion module 206 inserts the segmentation demarcations to the first conversation to differentiate the first conversation from the second conversation based on the topics and the widgets that are communicated between the first user 102 and the second user 112. The conversation snippet generation module 208 determines the one or more communication elements for each conversation associated with the segmentation demarcations on each messaging channel. The conversation snippet generation module 208 generates the conversation snippet by linking the one or more communication elements for each messaging channel. The segment generation module 210 links the conversation snippets to generate the segment associated with the conversation for each messaging channel using the lexical and non-lexical features. The rich persistent conversation history generation module 212 generates the rich persistent conversation history by linking the one or more segments from the one or more messaging channels. The one or more segments are linked based on the topic analysis performed at each conversation between the first user 102 and the second user 112.

FIG. 3A illustrates a user interface view of the first user device 104 of FIG. 1 that depicts a conversation between the first user 102 and the second user 112 according to an embodiment herein. The user interface view depicts that the first user 102 and the second user 112 are communicating using the first user device 104 and the second user device 110 through the server 108. In one embodiment, the first user 102 and the second user 112 are discussing about a wire transfer (e.g. I need to know when this will be done?). The second user 112 sends a reply (since you are using ACME Bank it will be done this Friday) to the first user 102 using the second user device 110. After that, the first user 102 and the second user 112 may discuss about ordering cheques. The server 108 may obtain a request for ordering a cheque book from the first user device 104 of the first user 102 (e.g. I need to order a cheque book). The server 108 demarcates boundaries in each of the one or more media contents associated with the conversations based on the activity of the first user 102 and the second user 112 by analyzing the topics (e.g. the wire transfer or ordering cheques) of each conversation between the first user 102 and the second user 112. In one embodiment, switch in topics indicates a new segmentation begins and the previous one is ended.

FIG. 3B illustrates a user interface view of the first user device 104 of FIG. 1 that depicts insertion of a segmentation demarcation 304 in the conversation of FIG. 3A according to an embodiment herein. In one embodiment, the server 108 may link series of interactions together with the segmentation due to detecting similar topics and the widgets used. The server 108 inserts the segmentation demarcation 304 (e.g. a cheque order wizard) to the first conversation to differentiate the first conversation from the second conversation based on the topics and the widgets that are communicated between the first user 102 and the second user 112. The server 108 may send information that includes a cheque order reference number, an account number and a number of cheques to the first user 102.

Figure 4:
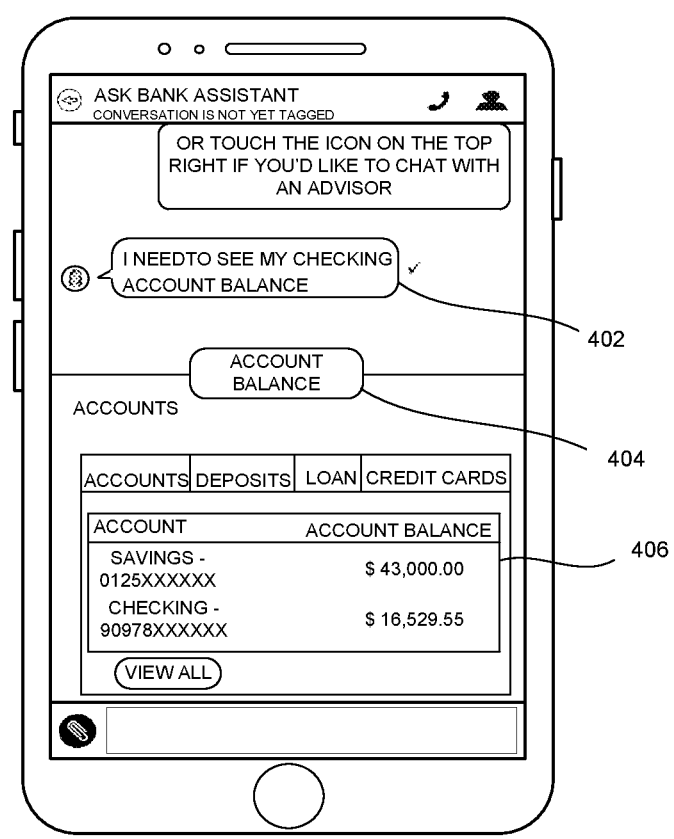
FIG. 4 illustrates a user interface view of the first user device of FIG. 1 that depicts insertion of the segmentation demarcation according to an embodiment herein.

FIG. 4 illustrates a user interface view of the first user device 104 of FIG. 1 that depicts insertion of the segmentation demarcation according to an embodiment herein. The user interface view depicts an unstructured natural language 402, the segmentation demarcation 404 and a widget 406. The server 108 receives a request from the first user 102 through the first user device 104. The server 108 obtains details for the request in a form of the unstructured natural language 402 (e.g. I need to see my checking account balance) from the first user device 104. The server 108 inserts the segmentation demarcation 404 i.e. topic segmentation (e.g. account balance) to the conversation between the first user 102 and the second user 112. The server 108 may send the widget 406 that includes details of accounts, deposits, loans and credit cards. In one embodiment, the first user 102 may select the accounts option to view the account balance in his/her account. In one embodiment, the server 108 may provide options to the first user 102 to reject the first conversation with the second user 112 (when the first user 102 touch an icon in a messaging conversation).

Figure 5A:
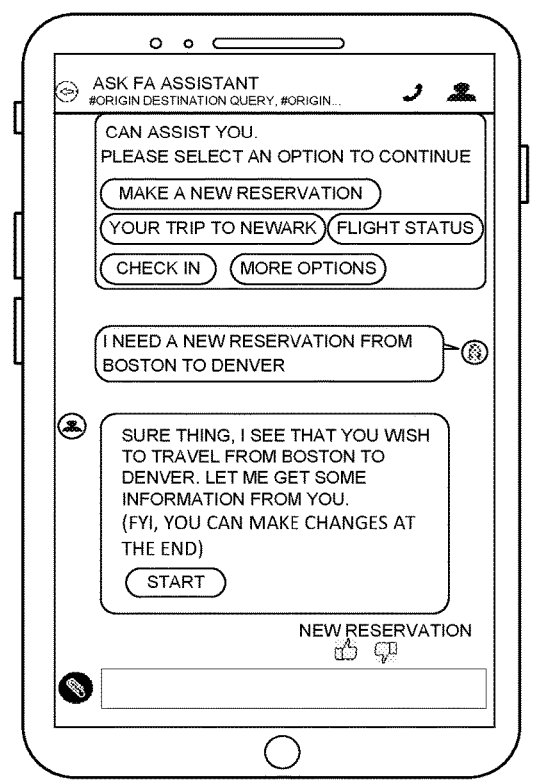
FIGS. 5A-5C illustrate user interface views of the first user device of FIG. 1 that depicts a conversation between the first user and the second user for a travel plan according to an embodiment herein.
Figure 5B:
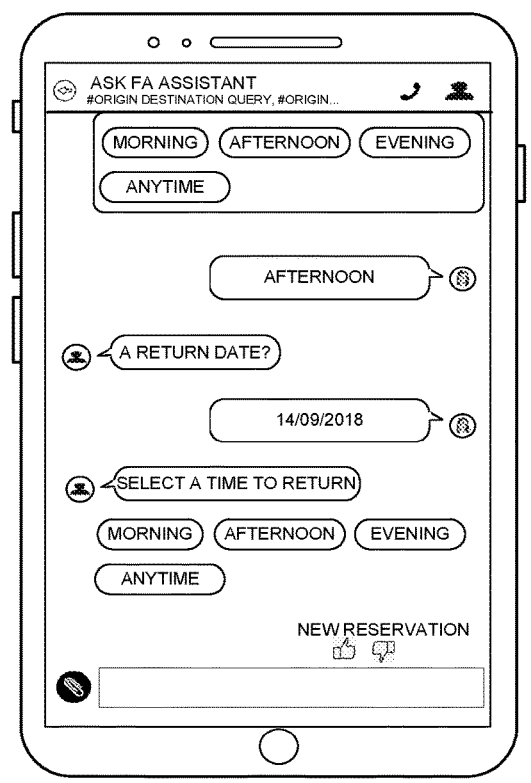
Figure 5C:
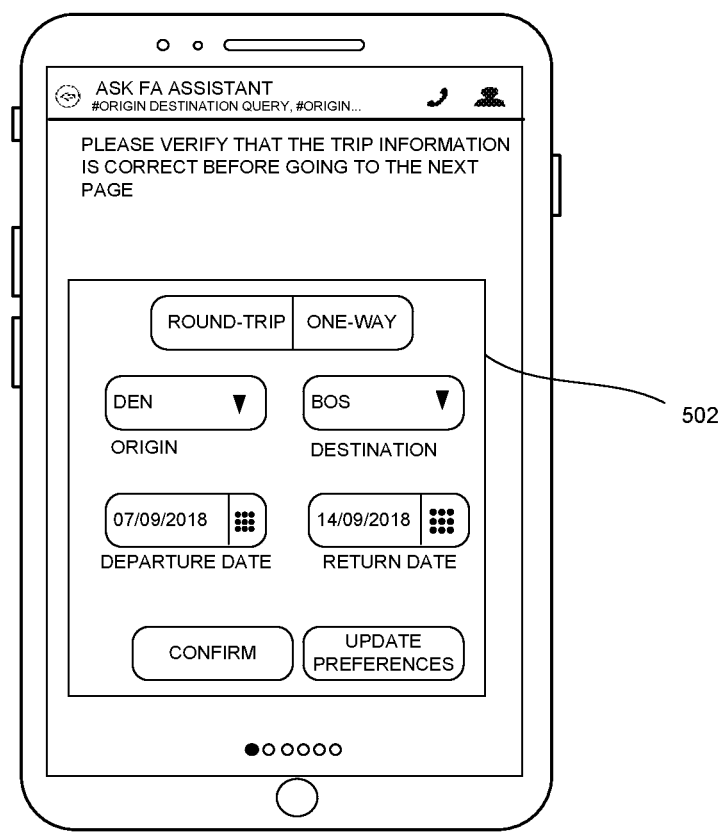

FIGS. 5A-5C illustrate user interface views of the first user device 104 of FIG. 1 that depicts a conversation between the first user 102 and the second user 112 for a travel plan according to an embodiment herein. In one embodiment, the first user 102 may request the server 108 to reserve tickets for travelling from one place to another place. The server 108 may send options to the first user 102 through the first user device 104. In one embodiment, the server 108 enables the first user 102 to select an option from at least one of (i) make a new reservation, (ii) your trip to Newark, (iii) flight status, (iv) check in and (v) more options. In one embodiment, the first user 102 selects the option make a new reservation and sends a message that includes a departure place and a destination place (e.g. I need a new reservation from Boston to Denver) to the second user 112. In one embodiment, the second user 112 receives the message from the first user 102 and communicates a reply (e.g. I see that you wish to travel from Boston to Denver. Let me get some information from you.) to enable the first user 102 to select travel time (e.g. Morning, Afternoon, Evening or anytime). The first user 102 may select the travel time, return date and return time based on the reply from the second user 112. The server 108 may generate a conversation snippet 502 by determining the one or more communication elements (e.g. the messages that are communicated between the first user 102 and the second user 112) in the conversation between the first user 102 and the second user 112. The server 108 communicates the conversation snippet 502 that includes origin, destination, departure date and return date and enables the first user 102 to confirm or update preferences on the conversation snippet 502 using the first user device 104.

Figure 6:
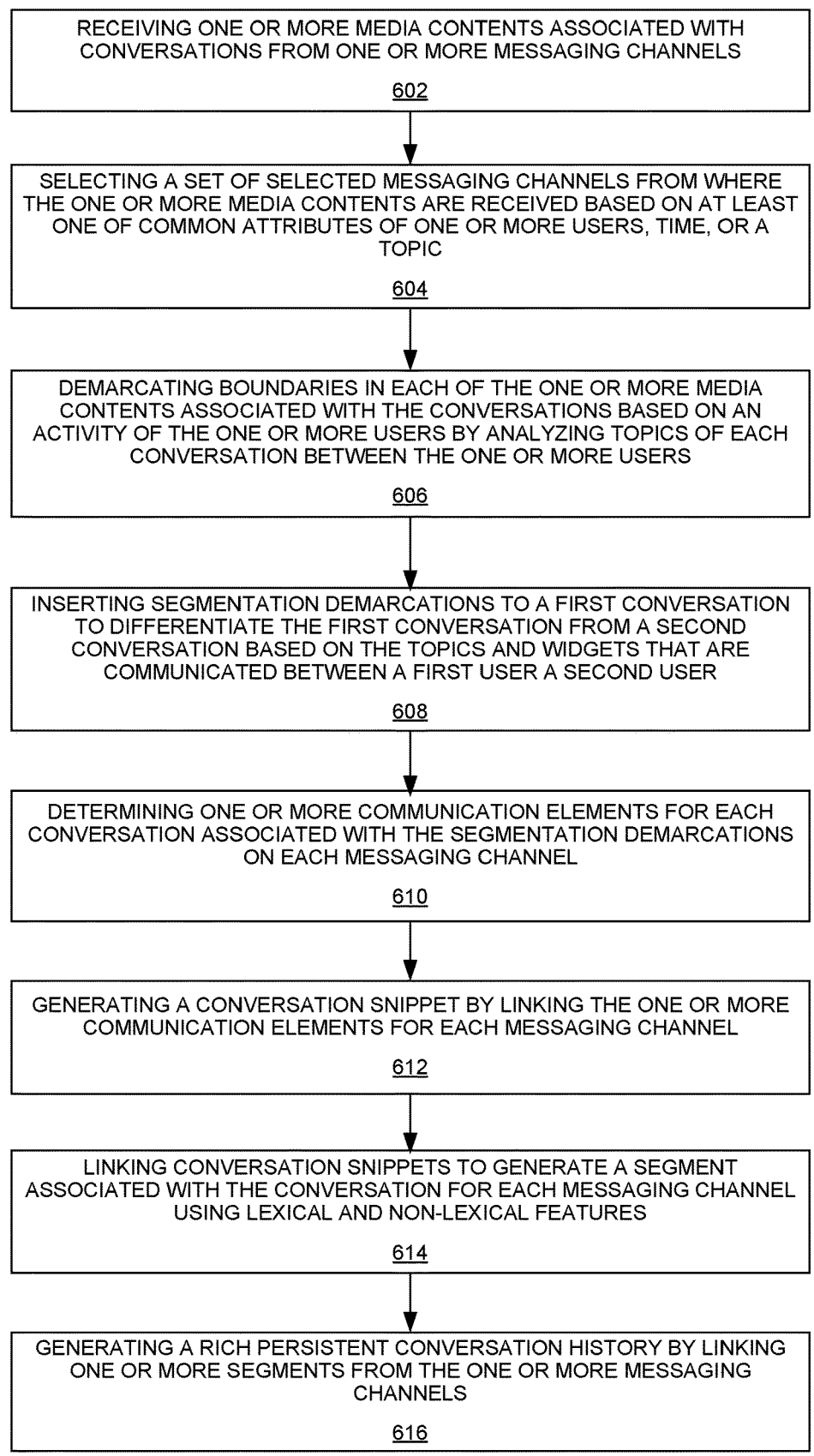
FIG. 6 is a flow diagram that illustrates a method for generating a rich persistent conversation history from structured and unstructured information using a communications protocol according to an embodiment herein.

FIG. 6 is a flow diagram that illustrates a method for generating a rich persistent conversation history from structured and unstructured information using a communications protocol according to an embodiment herein. At step 602, the one or more media contents associated with the conversations are received from the one or more messaging channels. At step 604, the set of selected messaging channels is selected from where the one or more media contents are received based on at least one of common attributes of the first user 102 and the second user 112, time, or a topic. At step 606, boundaries in each of the one or more media contents associated with the conversations are demarcated based on the activity of the first user 102 and the second user 112 by analyzing topics of each conversation between the first user 102 and the second user 112. At step 608, segmentation demarcations are inserted to the first conversation to differentiate the first conversation from the second conversation based on the topics and the widgets that are communicated between the first user 102 and the second user 112. The first conversation is the previous conversation between the first user 102 and the second user 112 and the second conversation is a present conversation between the first user 102 and the second user 112. At step 610, the one or more communication elements for each conversation associated with the segmentation demarcations on each messaging channel are determined. At step 612, the conversation snippet is generated by linking the one or more communication elements for each messaging channel. At step 614, the conversation snippets are linked to generate the segment associated with the conversation for each messaging channel using the lexical and non-lexical features. At step 616, the rich persistent conversation history is generated by linking the one or more segments from the one or more messaging channels. The one or more segments are linked based on the topic analysis performed at each conversation between the first user 102 and the second user 112.

The embodiments herein may comprise a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
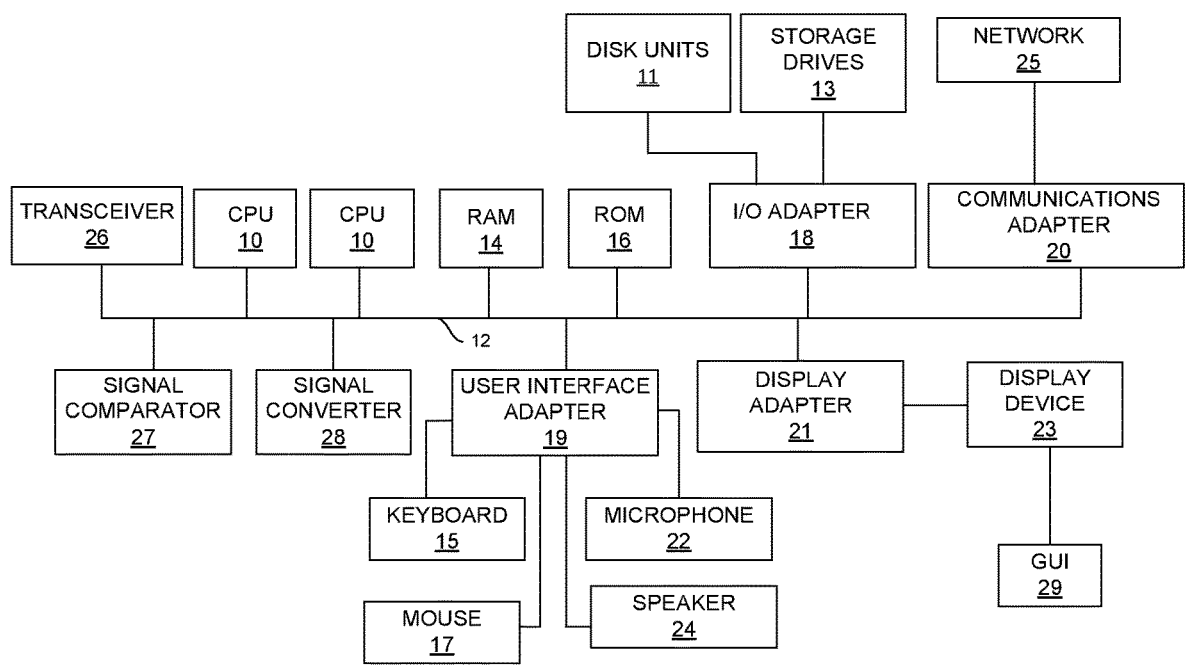
FIG. 7 is a server used in accordance with the embodiments herein.

A representative hardware environment for practicing the embodiments herein is depicted in FIG. 7, with reference to FIGS. 1 through 6. This schematic drawing illustrates a hardware configuration of a server/computer system/computing device 108 in accordance with the embodiments herein. The server 108 comprises at least one processing device 10. The special-purpose CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The server 108 can read the inventive instructions on the program storage devices and follow these instructions to execute the methodology of the embodiments herein.

The server 108 further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The system for creating a rich persistent conversation history using a communication protocol provides a rich communication content that can handle multiple content types and inputs from multiple channels. The system also provides ability to store, update and retrieve communication content flowing through the messaging channel.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for generating a rich persistent conversation history from structured and unstructured information using a communication protocol, said method comprising:
   receiving a plurality of media contents associated with conversations from a plurality of messaging channels;
   selecting a set of selected messaging channels from where said plurality of media contents are received based on at least one of common attributes of a plurality of users, time, or a topic;
   demarcating boundaries in each of said plurality of media contents associated with said conversations based on an activity of said plurality of users by analyzing topics of each conversation between said plurality of users;
   inserting segmentation demarcations to a first conversation to differentiate said first conversation from a second conversation based on said topics and widgets that are communicated between a first user and a second user, wherein said first conversation is a previous conversation between said first user and said second user and said second conversation is a present conversation between said first user and said second user;
   determining a plurality of communication elements for each conversation associated with said segmentation demarcations on each messaging channel;
   generating a conversation snippet by linking said plurality of communication elements for each messaging channel;
   linking conversation snippets to generate a segment associated with said conversation for each messaging channel using lexical and non-lexical features; and
   generating said rich persistent conversation history by linking a plurality of segments from said plurality of messaging channels, wherein said plurality of segments are linked based on said topic analysis performed at each conversation between said first user and said second user.

2. The method of claim 1, further comprises generating a cross channel segment by linking said conversations received from said plurality of messaging channels based on said topics.

3. The method of claim 1, wherein said conversation snippets in said segment associated with said messaging channel are linked with other segment associated with other messaging channel.

4. The method of claim 1, wherein said plurality of media contents comprise at least one of (a) a text message conversation, (b) a voice call conversation, (c) a video call conversation, or (d) any other digital form of communication between said plurality of users.

5. The method of claim 1, further comprising
   inserting said segmentation demarcations in said conversation when said first user initiates a workflow or a widget during said conversation to differentiate said conversation, wherein said segmentation demarcations are inserted when said first user initiates said activity in said messaging channel or said conversation is manually closed by said first user or said second user, wherein said activity comprises at least one of (a) switching to one conversation to another conversation, (b) initiating a voice call to said second user or (c) initiating a video call to said second user.

6. The method of claim 1, wherein said conversation snippet comprises said plurality of media contents related to a particular conversation between said first user and said second user for a particular timestamp.

7. The method of claim 1, wherein said plurality of segments comprise at least one of (a) a text conversation between said first user and said second user, (b) a voice call conversation between said first user and said second user, (c) a recorded call conversation between said first user and said second user or (d) any other digital form of communication between said first user and said second user.

8. The method of claim 1, further comprising
   identifying said conversation snippets to be displayed to said first user from said rich persistent conversation history based on a request received from said first user; and
   displaying said conversation snippets to said first user when said first user request for said conversation snippets.

9. The method of claim 8, wherein said rich persistent conversation history comprises said plurality of segments of said conversations between said first user and said second user.

10. The method of claim 4, wherein said voice call of a voice channel is fed to said messaging channel in said form of control messages, wherein said voice call is being initiated as an "info" message into said messaging channel.

11. The method of claim 10, wherein said voice call is recorded as a media message in said messaging channel, adds transcripts in either as a regular chat message or as an info message and integrates said rich persistent conversation history from said voice channel into said messaging channel.

12. One or more non-transitory computer readable storage mediums storing one or more sequences of instructions, which when executed by one or more processors, causes a processor implemented method for generating a rich persistent conversation history from structured and unstructured information using a communication protocol performing the steps of:
   receiving a plurality of media contents associated with conversations from a plurality of messaging channels;
   selecting a set of selected messaging channels from where said plurality of media contents are received based on at least one of common attributes of a plurality of users, time, or a topic;
   demarcating boundaries in each of said plurality of media contents associated with said conversations based on an activity of said plurality of users by analyzing topics of each conversation between said plurality of users;
   inserting segmentation demarcations to a first conversation to differentiate said first conversation from a second conversation based on said topics and widgets that are communicated between a first user and a second user, wherein said first conversation is a previous conversation between said first user and said second user and said second conversation is a present conversation between said first user and said second user;
   determining a plurality of communication elements for each conversation associated with said segmentation demarcations on each messaging channel;
   generating a conversation snippet by linking said plurality of communication elements for each messaging channel;
   linking conversation snippets to generate a segment associated with said conversation for each messaging channel using lexical and non-lexical features; and
   generating said rich persistent conversation history by linking a plurality of segments from said plurality of messaging channels, wherein said plurality of segments are linked based on said topic analysis performed at each conversation between said first user and said second user.

13. The one or more non-transitory computer readable storage mediums storing the one or more sequences of instructions of claim 12, which when executed by one or more processors, further causes generation of a cross channel segment by linking said conversations received from said plurality of messaging channels based on said topics.

14. The one or more non-transitory computer readable storage mediums storing the one or more sequences of instructions of claim 12, wherein said conversation snippets in said segment associated with said messaging channel are linked with other segment associated with other messaging channel.

15. The one or more non-transitory computer readable storage mediums storing the one or more sequences of instructions of claim 12, wherein said plurality of media contents comprise at least one of (a) a text message conversation, (b) a voice call conversation, (c) a video call conversation, or (d) any other digital form of communication between said plurality of users.

16. The one or more non-transitory computer readable storage mediums storing the one or more sequences of instructions of claim 12, which when executed by one or more processors, further causes insertion of said segmentation demarcations in said conversation when said first user initiates a workflow or said widget during said conversation to differentiate said conversation, wherein said segmentation demarcations are inserted when said first user initiates said activity in said messaging channel or said conversation is manually closed by said first user or said second user, wherein said activity comprises at least one of (a) switching to one conversation to another conversation, (b) initiating a voice call to said second user or (c) initiating a video call to said second user.

17. The one or more non-transitory computer readable storage mediums storing the one or more sequences of instructions of claim 12, wherein said conversation snippet comprises said plurality of media contents related to a particular conversation between said first user and said second user for a particular timestamp.

18. The one or more non-transitory computer readable storage mediums storing the one or more sequences of instructions of claim 12, wherein said plurality of segments comprise at least one of (a) a text conversation between said first user and said second user, (b) a voice call conversation between said first user and said second user, (c) a recorded call conversation between said first user and said second user or (d) any other digital form of communication between said first user and said second user.

19. A system for generating a rich persistent conversation history from structured and unstructured information using a communication protocol, said system comprising:
   a memory that stores a set of instructions; and
   a processor that executes the set of instructions and is configured to:
      receive a plurality of media contents associated with conversations from a plurality of messaging channels;
      select a set of selected messaging channels from where said plurality of media contents are received based on at least one of common attributes of a plurality of users, time, or a topic;
      demarcate boundaries in each of said plurality of media contents associated with said conversations based on an activity of said plurality of users by analyzing topics of each conversation between said plurality of users;
      insert segmentation demarcations to a first conversation to differentiate said first conversation from a second conversation based on said topics and widgets that are communicated between a first user and a second user, wherein said first conversation is a previous conversation between said first user and said second user and said second conversation is a present conversation between said first user and said second user;
      determine a plurality of communication elements for each conversation associated with said segmentation demarcations on each messaging channel;
      generate a conversation snippet by linking said plurality of communication elements for each messaging channel;
      link conversation snippets to generate a segment associated with said conversation for each messaging channel using lexical and non-lexical features; and generate said rich persistent conversation history by linking a plurality of segments from said plurality of messaging channels, wherein said plurality of segments are linked based on said topic analysis performed at each conversation between said first user and said second user.

20. The system of claim 19, wherein said processor is further configured to generate a cross channel segment by linking said conversations received from said plurality of messaging channels based on said topics.

* * * * *